S. A. JOHNSON.
BRACELET END HOOK.
APPLICATION FILED NOV. 21, 1917.

1,315,226.    Patented Sept. 9, 1919.

Inventor
S. A. Johnson
by H. J. S. Dennison
Atty.

UNITED STATES PATENT OFFICE.

SYLVESTER A. JOHNSON, OF TORONTO, ONTARIO, CANADA, ASSIGNOR TO THE HADLEY MFG. COMPANY, LIMITED, OF TORONTO, ONTARIO, CANADA.

BRACELET END HOOK.

1,315,226.     Specification of Letters Patent.     Patented Sept. 9, 1919.

Application filed November 21, 1917. Serial No. 203,141.

*To all whom it may concern:*

Be it known that I, SYLVESTER A. JOHNSON, a citizen of the United States of America, and resident of the city of Toronto, county of York, Province of Ontario, in the Dominion of Canada, have invented certain new and useful Improvements in Bracelet End Hooks, as described in the following specification and illustrated in the accompanying drawings, that form part of the same.

The principal objects of this invention are, to obviate the difficulties and inconveniences caused through the failure to release, and to provide an end hook which will lock securely in its closed position and which will not be liable to get out of order so as to fail to lock or unlock readily.

A further object of this invention is to devise a structure which will be strong and durable and will be simple and comparatively inexpensive to manufacture and further which will allow of the use of "filled" stock without exposing base metal surfaces.

The principal feature of the invention consists in the novel construction and arrangement of parts, whereby the hook member is slidably supported in the link sides and is adapted to interlock with a stationary latch member to secure it in its locked position.

In the accompanying drawings, Figure 1 is an enlarged perspective view of a link constructed in accordance with this invention.

Figure 1:
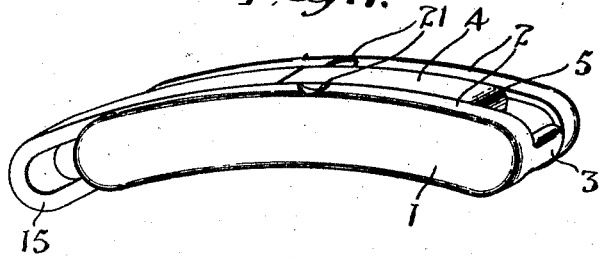

It has been known to form bracelet fasteners with a sliding hook member having a spring detent adapted to spring outwardly into a slot or notch in an inclosing tubular guide but such construction besides being extremely expensive to manufacture is very susceptible to injury to the thin tubing in such a manner as to prevent the link from being unlocked and also to prevent its being properly locked and otherwise rendering the operation of the link useless.

The desirability of a positive locking element of a strong and durable nature has become very desirable as the class of goods requiring such fasteners have rapidly come into extensive use and in the present invention a positive locking latch mechanism of substantial structure is provided.

In carrying out my construction of bracelet link the sides 1 are pressed up in the form shown with the edge flanges 2 turned inwardly. The sides are connected together at the ends by the cross bars 3 which are formed and secured in an ordinary well known manner.

Before securing the sides together the locking members are placed therebetween. The stationary locking member 4 is secured at the end 5 to the laterally bent end 6 of a plate 7 which fits tightly into the recess formed in the inner side of one of the sides 1. This member 4 is preferably formed from a solid piece of material having the central portion punched out to form a longitudinal recess 8.

The upper member 9 is curved to conform to the curvature of the outer edge of the link and has considerable length of flexibility. The end of this upper member 9 is formed with a hook latch end 10 curving inwardly from the outer face and adapted to interlock with a correspondingly formed hook latch portion 11 of the sliding hook member 12.

Figure 2:
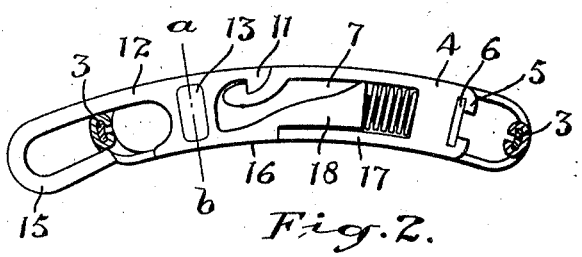
Fig. 2 is an enlarged side elevational view of a link with one of the sides removed and showing the members in their locked position.
Figure 3:
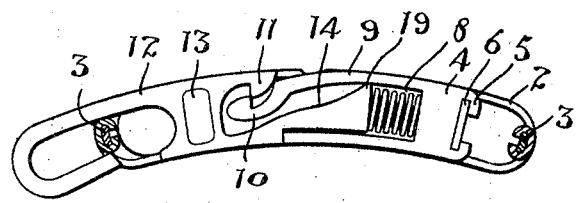
Fig. 3 is a view similar to Fig. 2, showing the members in the position of disengaging.
Figure 5:
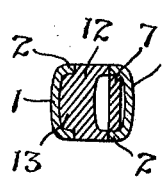
Fig. 5 is a cross sectional view through the link on the line $a-b$ of Fig. 2.

The sliding hook 12 is formed of a single piece of metal of the same width and thickness as the member 4 and is adapted to slide between the face of the plate 7 forming the inner surface of one of the link sides and the edges of the adjacent link side and a boss 13 is pressed up from the metal of the member 12 to fit into the concaved inner side of the opposing side link. The latch end 11 is adapted to fit snugly into the hook latch 10 of the member 4 and continues the upper surface of the link and this latch end is formed with a curved or sloping end surface 14 to ride upon the curved spring end of the member 9 and to depress the same until the locking surfaces spring together and engage in locking contact as is clearly shown in Figs. 2 and 3 of the drawings.

The outer hook end 15 of the member 12 rides upon the end cross bar 3 and the inner end of the hook extends beneath said cross bar well within the link when the parts are locked together so that the hook is completely closed.

The inner edge 16 of the member 12 conforms to the curvature of the inner side of the link and extends to meet the lower portion 17 of the stationary member 4, thus forming a continuous surface on the inner side of the link when the link is closed.

The lower portion of the sliding hook member 12 is formed with an extension end 18 which is offset inwardly from the inner edge 16 and extends into the longitudinal recess 8, said extension having its surface so formed as to not interfere with the freedom of movement of the flexible latch member 9 but its extremity is formed with a toe 19 which engages the inner side of the member 9 and slides thereon.

Figure 4:
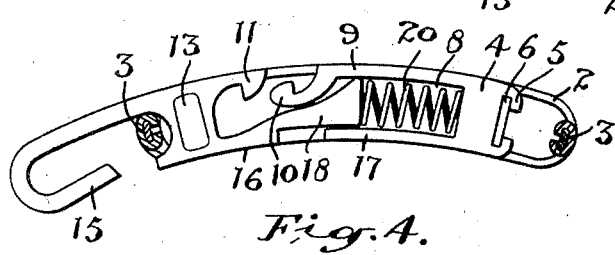
Fig. 4 is a similar view to Figs. 1 and 2 showing the hook unlocked and in the extended position.

A coil spring 20 is inserted between the end of the extension 18 and the end of the recess 8 and forces the hook member 12 outwardly to its open position as shown in Fig. 4, upon the release of the latch lock.

The upper edge surfaces of the flanges 2 of the sides of the link are provided with suitable indentations 21 to allow the finger nail to be pressed against the upper side of the spring member 9 to allow it to be depressed sufficiently to disengage the latch members.

It will be seen from this description and the drawings that the inter-locking members are each formed of a single piece of metal in such a manner that they may be readily stamped out of any desirable metal, either solid or filled, and that when filled metal is used no unplated surfaces will be exposed when the link is closed. The construction is very strong, even though in its nature and for its use it is naturally very small and it will therefore withstand very great wear without getting out of order.

What I claim as my invention is:—

1. A bracelet hook end comprising, a pair of link sides rigidly spaced apart, a latch member rigidly secured between said link sides, and at one end thereof a hook member slidably supported by the link sides and adapted to interlock with said stationary latch member.

2. A bracelet hook end, comprising, a pair of link sides spaced apart and rigidly connected at the ends, a solid block of metal fixedly secured at one end between said link sides, and having a latch extension at the inner end, and a hook member slidably supported in the link sides and formed with a latch adapted to engage with the stationary latch member upon the closing of the hook.

3. A bracelet hook end, comprising, a pair of link sides spaced apart and rigidly connected at the ends, a unitary piece of metal rigidly secured at one end of the link between the sides and having a spring latch arm, and a hook member formed of a unitary piece of metal slidably supported in the link sides and having a latch member adapted to engage with the stationary spring latch member.

4. A bracelet hook end, comprising, a pair of link sides rigidly secured together at the ends, a metal block rigidly secured between the sides one end thereof and having a longitudinal recess therein opening inwardly and forming a spring latch arm, a hook member formed of a block of metal slidably supported in said sides having a rigid latch member adapted to interlock with the spring latch of the adjacent member and having a guide portion extending into and slidably engaging the inner walls of the longitudinal recess, and a compression spring inserted in said longitudinal recess.

5. A bracelet hook end, comprising, a pair of link sides each formed with inwardly flanged edges, a plate secured between the flanged edges of one of said sides and having a laterally turned end, a metal block rigidly secured to the laterally turned end of said plate member and fitting snugly between the flanges of the adjacent link sides and formed with a spring latch arm, a sliding hook member having a latch member to engage the latch of the adjacent member and formed with a lateral extension projecting into the concaved link side and slidably securing said hook member in place, and a spring inclosed between said stationary member and slidable hook adapted to force the hook outwardly upon the release of the latch.

S. A. JOHNSON.

Copies of this patent may be obtained for five cents each, by addressing the "Commissioner of Patents, Washington, D. C."